United States Patent [19]

Brown et al.

[11] Patent Number: 5,504,165

[45] Date of Patent: Apr. 2, 1996

[54] POLY(PHENYLENE ETHER)-POLY(ARYLENE SULFIDE)RESIN COMPOSITIONS.

[75] Inventors: Sterling B. Brown, Schenectady, N.Y.; Chorng-Fure R. Hwang, Cary, N.C.; Farid F. Khouri, Clifton Park, N.Y.; Steven T. Rice, Scotia, N.Y.; James J. Scobbo, Jr., Slingerland, N.Y.; John B. Yates, III, Glenmont, N.Y.

[73] Assignee: General Electric Company, Pittsfield, Mass.

[21] Appl. No.: 405,669

[22] Filed: Mar. 17, 1995

[51] Int. Cl.⁶ ............................. C08L 71/12; C08L 81/04
[52] U.S. Cl. ..................... 525/390; 525/391; 525/537; 525/905
[58] Field of Search ............................ 525/390, 391, 525/537, 905

[56] References Cited

U.S. PATENT DOCUMENTS

| | | | |
|---|---|---|---|
| 4,021,596 | 5/1977 | Bailey | 428/375 |
| 4,451,607 | 5/1984 | Garcia et al. | 524/494 |
| 4,476,284 | 10/1984 | Clearly | 525/92 |
| 4,528,346 | 7/1985 | Sugie et al. | 525/523 |
| 4,704,448 | 11/1987 | Brugel | 528/125 |
| 4,889,893 | 12/1989 | Kobayashi et al. | 525/189 |
| 5,026,764 | 6/1991 | Okabe et al. | 525/537 |
| 5,028,656 | 7/1991 | Okabe et al. | 525/537 |
| 5,047,465 | 9/1991 | Auerbach | 524/504 |
| 5,115,042 | 5/1992 | Khouri et al. | 525/390 |
| 5,122,578 | 6/1992 | Han et al. | 525/537 |
| 5,132,373 | 7/1992 | Khouri et al. | 525/390 |
| 5,142,049 | 8/1992 | Khouri et al. | 544/218 |
| 5,162,433 | 11/1992 | Nishio et al. | 525/66 |
| 5,162,448 | 11/1992 | Khouri et al. | 525/390 |
| 5,212,255 | 5/1993 | Khouri et al. | 525/391 |
| 5,227,429 | 7/1993 | Kawamura et al. | 525/537 |
| 5,247,006 | 9/1993 | Khouri et al. | 525/397 |
| 5,290,881 | 3/1994 | Dekkers | 525/397 |
| 5,292789 | 3/1994 | Ishida et al. | 524/320 |
| 5,376,714 | 12/1994 | yates | 524/130 |
| 5,399,610 | 3/1995 | Yates et al. | 525/397 |

FOREIGN PATENT DOCUMENTS

| | | |
|---|---|---|
| 0104543A1 | 4/1984 | European Pat. Off. . |
| 0225144B1 | 6/1987 | European Pat. Off. . |
| 0228268B1 | 7/1987 | European Pat. Off. . |
| 0341421A2 | 4/1989 | European Pat. Off. . |
| 0341422A2 | 11/1989 | European Pat. Off. . |
| 0360544A2 | 3/1990 | European Pat. Off. . |
| 0368413A2 | 5/1990 | European Pat. Off. . |
| 0394933A3 | 10/1990 | European Pat. Off. . |
| 0407216A1 | 1/1991 | European Pat. Off. . |
| 0405135A1 | 1/1991 | European Pat. Off. . |
| 0412572A2 | 2/1991 | European Pat. Off. . |
| 0438777A3 | 7/1991 | European Pat. Off. . |
| 0438051A3 | 7/1991 | European Pat. Off. . |
| 0475038A2 | 3/1992 | European Pat. Off. . |
| 0472960A3 | 3/1992 | European Pat. Off. . |
| 0472913A2 | 3/1992 | European Pat. Off. . |
| 0479560A2 | 4/1992 | European Pat. Off. . |
| 0506006A2 | 9/1992 | European Pat. Off. . |
| 524705-A2 | 1/1993 | European Pat. Off. . |
| 0549977A1 | 7/1993 | European Pat. Off. . |
| 50-156561-A | 12/1975 | Japan . |
| 60-053562-A | 3/1985 | Japan . |
| 61-021156-A | 1/1986 | Japan . |
| 62-65351 | 3/1987 | Japan . |
| 63-97662 | 4/1988 | Japan . |
| 63-205358-A | 8/1988 | Japan . |
| 01031862-A | 2/1989 | Japan . |
| 1-213360 | 8/1989 | Japan . |
| 1-213361 | 8/1989 | Japan . |
| 1-240566 | 9/1989 | Japan . |
| 1-266160 | 10/1989 | Japan . |
| 01259060-A | 10/1989 | Japan . |
| 2-75656 | 3/1990 | Japan . |
| 02155951-A | 6/1990 | Japan . |
| 2-252761 | 10/1990 | Japan . |
| 3-121159 | 5/1991 | Japan . |
| 3-126761 | 5/1991 | Japan . |
| 04213358-A | 5/1991 | Japan . |
| 03126761-A | 5/1991 | Japan . |
| 3-153757 | 7/1991 | Japan . |
| 3205452-A | 9/1991 | Japan . |
| 3-244661 | 10/1991 | Japan . |
| 3-265661 | 11/1991 | Japan . |
| 4-59870 | 2/1992 | Japan . |
| 4-59871 | 2/1992 | Japan . |
| 4096972-A | 3/1992 | Japan . |
| 4-122770 | 4/1992 | Japan . |
| 4-130158 | 5/1992 | Japan . |
| 04132766-A | 5/1992 | Japan . |
| 4-198268 | 7/1992 | Japan . |
| 4-211927 | 8/1992 | Japan . |
| 04211926-A | 8/1992 | Japan . |
| 4-213358 | 8/1992 | Japan . |
| 04259540-A | 9/1992 | Japan . |
| 4264163-A | 9/1992 | Japan . |
| 4-318067 | 11/1992 | Japan . |
| 4-339861 | 11/1992 | Japan . |
| 5098159-A | 4/1993 | Japan . |
| 5170907-A | 7/1993 | Japan . |
| 5339501-A | 12/1993 | Japan . |
| 5320506-A | 12/1993 | Japan . |
| WO92/01749 | 3/1991 | WIPO . |

Primary Examiner—Thomas Hamilton, III

[57] ABSTRACT

Thermoplastic resin compositions comprising in admixture a poly(phenylene ether) resin and a poly(arylene sulfide) resin are provided. The poly(phenylene ether) resin comprises an ortho ester moiety which enhances the compatibility and mechanical properties of the composition. The compositions may optionally comprise impact modifiers and other additives. The compositions are useful for making molded articles.

12 Claims, No Drawings

POLY(PHENYLENE ETHER)-POLY(ARYLENE SULFIDE)RESIN COMPOSITIONS.

BACKGROUND OF THE INVENTION

1. Field of the Invention

This invention relates to poly(arylene sulfide)-poly(phenylene ether) resin compositions, and more particularly relates to compatibilized poly(arylene sulfide)-poly(phenylene ether) resin compositions and methods for preparation thereof.

2. Description of the Related Art

The poly(phenylene ether) resins are a widely used class of thermoplastic engineering resins characterized by excellent hydrolytic stability, dimensional stability, toughness, heat resistance and dielectric properties. However, they are deficient in certain other properties such as solvent resistance.

For their part, poly(arylene sulfide)s are crystalline engineering thermoplastics with high crystalline melting temperatures, typically on the order of 285° C., and are characterized by low flammability, high modulus and excellent resistance to aggressive chemicals and solvents. However, their glass transition temperatures are very low, typically as low as 85° C.; as a consequence, heat distortion temperatures are low in the absence of reinforcement with fillers such as glass fiber. In addition, poly(arylene sulfide) resins are very brittle, as evidenced by a tensile elongation to break for poly(phenylene sulfide) which is usually no greater than about 2.5% and frequently below 1%.

It might be expected that blends containing poly(arylene sulfide)-poly(phenylene ether) resins could be prepared which would have such properties as high solvent resistance, high heat distortion temperature, good ductility and resistance to flammability. However, blends of this type are incompatible and undergo phase separation and delamination, as a result of little or no phase interaction between the two resin phases. Molded parts made from such blends are typically characterized by low tensile and impact strength.

Compatible poly(arylene sulfide)/poly(phenylene ether) resin compositions have been prepared by melt compounding of an epoxy triazine capped poly(phenylene ether) resin with a poly(arylene sulfide) containing epoxide reactive functional groups (see Han et al., U.S. Pat. No. 5,122,578, which is included herein by reference). Utilization of epoxy functionalized poly(phenylene ether) resin, however, has certain disadvantages associated with it, including that solution processes for formation of the epoxy functionalized poly(phenylene ether) resin can be expensive, and as set out in Khouri et al., U.S. Pat. No. 5,132,373, the use of epoxy chlorotriazines as capping agents has certain disadvantages including: the necessity to use compounds such as glycidol in the preparation of the epoxy chlorotriazines, wherein the glycidol is expensive and also has carcinogenic properties. Khouri et al., U.S. Pat. No. 5,132,373 sets out ortho ester capped poly(phenylene ether) resins and methods for preparation thereof, and is included herein by reference. Khouri et al., U.S. Pat. No. 5,212,255 sets out ortho ester grafted poly(phenylene ether) resins and methods for preparation thereof, and is included herein by reference.

Accordingly, the object of the present invention is to provide poly(arylene sulfide) resin/poly(phenylene ether) resin compositions which exhibit desired levels of impact strength, tensile strength and tensile elongation.

SUMMARY OF THE INVENTION

The present invention involves a composition comprising (a) an ortho ester functional poly(phenylene ether) resin and (b) a poly(arylene sulfide) resin. The composition preferably further includes at least one rubbery impact modifier. The present invention also involves melt preparing the composition by melt blending the poly(phenylene ether) resin containing ortho ester functional groups with a poly(arylene sulfide) resin containing functionality reactive with ortho ester groups.

DETAILED DESCRIPTION OF THE INVENTION

The poly(phenylene ether) resins (hereinafter known as "PPE") employed in the present invention are known polymers comprising a plurality of structural units of the formula (I)

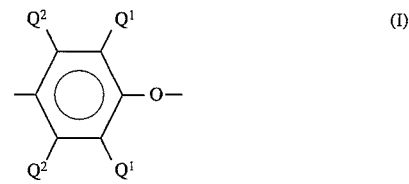

wherein each $Q^1$ is independently halogen, primary or secondary lower alkyl (i.e., alkyl containing up to about 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$ alkyl, and each $Q^2$ is hydrogen.

Both homopolymer and copolymer PPE are included. The preferred homopolymers are those containing 2,6-dimethyl-1,4-phenylene ether units. Suitable copolymers include random copolymers containing, for example, such units in combination with 2,3,6-trimethyl-1,4-phenylene ether units. Also included are PPE containing moieties prepared by grafting vinyl monomers or polymers such as polystyrenes and elastomers, as well as coupled PPE in which coupling agents such as low molecular weight polycarbonates, quinones, heterocycles and formals undergo reaction in known manner with the hydroxy groups of two PPE chains to produce a higher molecular weight polymer.

The PPE generally have a number average molecular weight within the range of about 3,000–40,000 and a weight average molecular weight within the range of about 20,000–80,000, as determined by gel permeation chromatography. Their intrinsic viscosity is most often in the range of about 0.15–0.6 dl./g., as measured in chloroform at 25° C.

The PPE are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful PPE for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the PPE contemplated for use in the present invention include all those presently known, irrespective of variations in structural units or ancillary chemical features.

For the purposes of the present invention, it is essential for at least some of the PPE to contain ortho ester groups, which may be present in the form of endgroups or substituents on the polymer chain. The term "ortho ester" means a compound in which one carbon atom is attached to another by a direct carbon-carbon bond, and to three further carbon atoms through oxygen. Such compounds can be considered to be esters of the hypothetical ortho acids R—C(OH)$_3$, wherein R is an organic radical. The existence of such ortho acids is for the most part unknown, since they immediately dehydrate to conventional carboxylic acids. However, esters of such acids are known and the compositions of this invention include certain polymer substituted esters of this type.

The ortho ester functional PPE preferably contain ortho ester moieties represented by the formula (II):

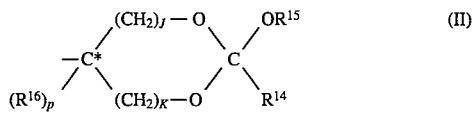

where $R^{15}$ is a $C_{1-4}$ primary or secondary alkyl radical or is an alkylene radical forming a second 5- or 6-membered ring with C*, and $R^{14}$ is a $C_{1-4}$ primary or secondary alkyl or $C_{6-10}$ aromatic radical, or $R^{14}$ and $R^{15}$ together with the atoms connecting them form a 5-, 6- or 7-membered ring;

$R^{16}$ is hydrogen or ($C_{1-4}$ primary or secondary alkyl;

K is 0 or 1;

J is from 1 or 2; and p is 0 when $R^{15}$ and C* form a ring and is otherwise 1.

The $R^{15}$ radical may be a $C_{1-4}$ primary or secondary alkyl radical such as methyl, ethyl, n-propyl, isopropyl, n-butyl, isobutyl or secondary butyl. Primary radicals and especially the methyl radical are generally preferred.

It is also possible for $R^{15}$ to form a second 5- or 6-membered ring with other portions of the molecule. For this purpose, one of the carbon atoms in the ortho ester ring is designated C* to indicate its role as part of said second ring.

The $R^{14}$ value may be a $C_{1-4}$ primary or secondary alkyl radical as defined above for $R^{15}$ or a $C_{6-10}$ aromatic (preferably aromatic hydrocarbon) radical. Finally, it is possible for $R^{14}$ and $R^{15}$ together to form a 5-, 6- or 7-membered ring with the atoms connecting them. Thus, the invention includes certain spiro ortho ester-functionalized PPE.

The $R^{16}$ radical may be hydrogen or an alkyl radical similar to $R^{14}$ and $R^{15}$. It is preferably hydrogen.

The values of J and K depend on whether the cyclic ortho ester moiety is a 5-membered or 6-membered ring. In general, 5-membered rings are preferred; that is, K is 0 and J is 1. However, the invention also includes compositions in which a 6-membered ring is present, which requires either that J and K both be 1 or that K be 0 and J be 2.

The value of the subscript p also depends on the cyclic structure of the ortho ester moiety. If C* is part of a ring structure with $R^{15}$, all four valences thereof are satisfied and p will be 0. If this is not the case, p will be 1.

The following is an illustrative ortho ester moiety (IEft) which may be present in the ortho ester functional PPE:

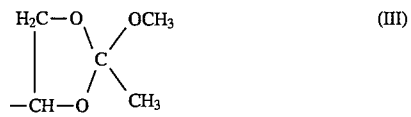

and which may also be referred to as a 4-(2-methoxy-2-methyl-1,3-dioxolanyl) radical and is usually preferred. Intermediates for preparation of such compounds include 4-hydroxymethyl-2- methoxy-2-methyl-1,3-dioxolane, which is obtainable by the reaction of glycerol and methyl ortho acetate. An improved method for the preparation of this and structurally related compounds in substantially pure form and the products thus obtained are disclosed in U.S. Pat. No. 5,231,197, which is incorporated herein by reference. The following illustrative ortho ester moiety (IV) may be present in the ortho ester functional PPE:

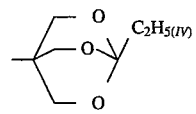

The above moiety may be referred to as a 4-(1-methyl-2,6,7-trioxabicyclo[2.2.21]octyl) radical; the methylol derivative thereof can be prepared by the reaction of ethyl ortho acetate with a substantially equimolar amount of pentaerythritol.

One variety of the ortho ester functional PPE is a PPE that is endcapped with an ortho ester group of the formula (V):

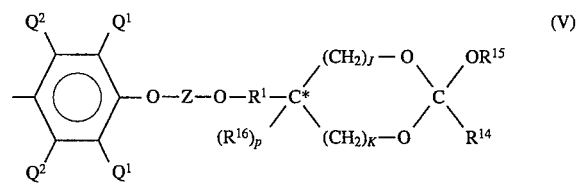

wherein:

(a) Each $Q^1$ and each $Q^2$ and $R^{14}$, $R^{15}$, $R^{16}$, J, K, p and C* are as previously defined. Examples of primary lower alkyl groups (i.e., alkyl groups having up to 7 carbon atoms) suitable as $Q^1$ and $Q^2$ are methyl, ethyl, n-propyl, n-butyl, isobutyl, n-amyl, isoamyl, 2-methylbutyl, n-hexyl, 2,3-dimethylbutyl, 2-, 3-, or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

(b) The $R^1$ radical may be a $C_{1-6}$ alkylene radical such as methylene, ethylene, propylene, trimethylene, pentamethylene or hexamethylene, and preferably is methylene.

(c) The Z radical may be any linking group which is substantially inert under the conditions of the PPE capping reaction. It generally serves principally as a spacer between the othoester moiety and the PPE chain; however, it may contain reactive groups of certain types, including groups displaceable by amine groups as described hereinafter. Illustrative Z moieties include the following formulae (VD:

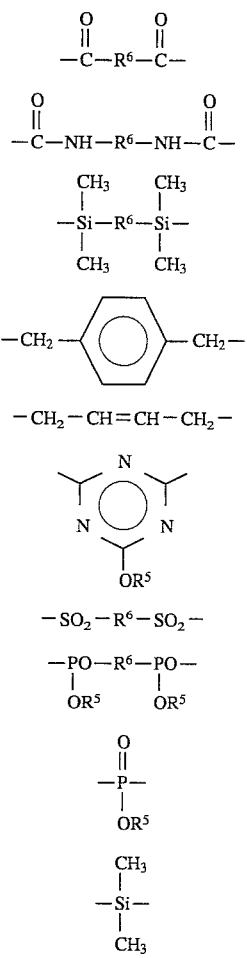

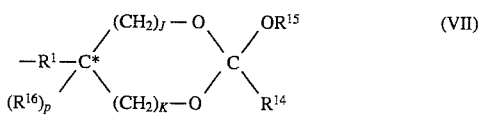

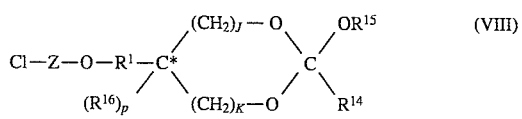

wherein $R^6$ is a divalent aliphatic, alicyclic or aromatic radical and $R^5$ is an alkyl, cycloalkyl or aromatic radical or an ortho ester radical of the formula (VII):

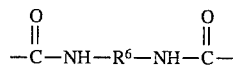 (VII)

wherein the $R^1$, $R^{14}$, $R^{15}$, $R^{16}$, J, K, p and C* are as previously defined.

An ortho ester endcapped PPE may be made by effecting a reaction between PPE and an ortho ester of the formula (VIII):

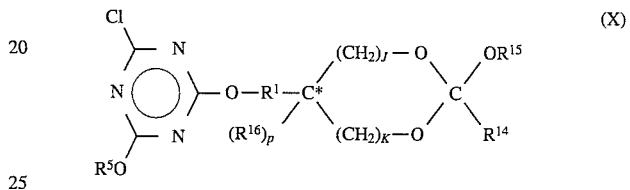 (VIII)

wherein the $R^1$, $R^{14}$, $R^{15}$, $R^{16}$, Z, J, K, p and C* are as previously defined.

The above ortho ester compounds (VIII) may be prepared by the reaction of a compound of the formula Z-Xq, wherein X is a good leaving group such as halide (especially chloride) and q is 2 or 3, with a hydroxy-substituted ortho ester of the formula (IX):

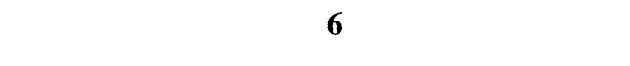 (IX)

wherein the $R^1$, $R^{14}$, $R^{15}$, $R^{16}$, Z, J, K, p and C* are as previously defined, under conditions readily ascertainable by those skilled in the art. Alternatively, compounds in which Z contains carbamate groups (e.g., has formula:

$$-\overset{O}{\overset{\|}{C}}-NH-R^6-NH-\overset{O}{\overset{\|}{C}}-$$

may be prepared by the reaction of a diisocyanate with a substantially equivalent amount of an ortho ester compound.

The preferred ortho ester compounds for preparing an ortho ester endcapped PPE have the formula (X):

(X)

wherein the $R^1$, $R^{14}$, $R^{15}$, $R^{16}$, J, K, p and C* are as previously defined, especially those in which $R^1$ is methylene. The preferred identity of $R^5$ will depend to some extent on the reactivity desired for the endcapped PPE and the nature of the other polymer with which copolymer formation is desired. Ortho ester groups are substantially more reactive with carboxylic acids groups than with amine groups. Thus, the formation of a copolymer between a capped PPE of this invention and the amine group in an amine-containing poly(arylene sulfide) or the like will require the presence of a Lewis acid as catalyst when $R^5$ is itself an ortho ester group or is substantially non-reactive; e.g., when it is an alkyl radical or a hindered aromatic radical such as 2,6-xylyl or mesityl (2,4,6-trimethylphenyl).

When $R^5$ is a relatively unhindered aromatic radical (e.g., phenyl), uncatalyzed displacement thereof by the amine group can take place with the formation of a copolymer. Accordingly, endcapped PPE of the invention in which $R^5$ is phenyl or a similarly unhindered aromatic radical, optionally activated by at least one electron-withdrawing substituent, contain two groups capable of copolymer-forming reactions, one (the ortho ester group) substantially with carboxylic acid groups and the other (the phenoxy group) with amine groups.

The ortho ester functional PPE may be prepared by solution-capping of PPE having hydroxy end groups with an ortho ester functionalized halotriazine. Suitable ortho ester functionalized halotriazines include 2-chloro-4-(2-methoxy-2-methyl-1,3-dioxolanyl)methoxy-6-phenoxy-1,3,5-triazine which may be represented by the formula (XI):

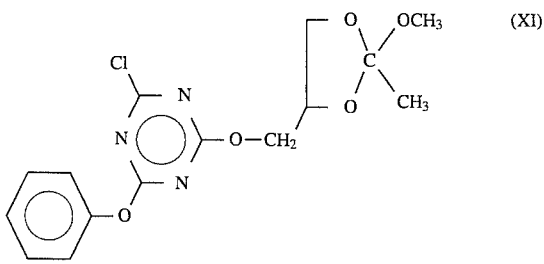 (XI)

The capping reaction may be performed by dissolving PPE in a solvent such as tolulene or chlorobenzene and adding water and a base such as sodium hydroxide in the presence of a phase transfer catalyst, and the halo ortho ester compound. The resultant ortho ester functional PPE can be isolated as a powder by precipitation from the solvent and filtration.

The PPE having ortho ester functional moieties is preferably prepared by melt extrusion of PPE with at least one graftable ethylenically unsaturated ortho ester monomer. The functional ortho ester monomer may be represented by the general formula (XII)

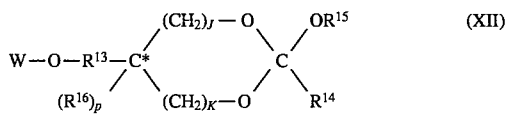

wherein $R^{14}$, $R^{15}$, $R^{16}$, J, K, p and C* are as previously defined, $R^{13}$ is a $C_{1-6}$ alkylene radical and W is a graftable unsaturated group represented by the following formula (XIII)

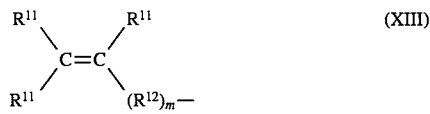

wherein each $R^{11}$ may independently be hydrogen; or a $C_{1-8}$ radical, or substituted derivatives thereof; or an aryl radical, or substituted derivative thereof; or any other group that is inert to the ortho ester. The value of m may be 1 or greater. $R^{12}$ can be one of the following formulae (XIV):

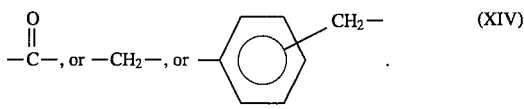

Illustrative examples of ortho ester monomers which may be employed in the present invention include 4-acryloyloxymethyl-2-methoxy-2-methyl-1,3-dioxolane, 4-methacryloyloxymethhyl-2-methoxy-2-methyl-1,3-dioxolane, 4-acryloyloxymethyl-2-methoxy-2-phenyl-1,3dioxolane and the isomeric mixture of 4-(2-methoxy-2-methyl-1,3dioxolanyl)methyl vinylbenzyl ethers. Methods for the preparation of various useful ortho ester materials and their reaction with PPE can be found in U.S. Pat. Nos. 5,132,373, 5,142,049, 5,171,866, 5,153,290 and 5,212,255, which are all incorporated herein by reference.

Preferably the ethylenically unsaturated ortho ester monomer is of the formula (XV):

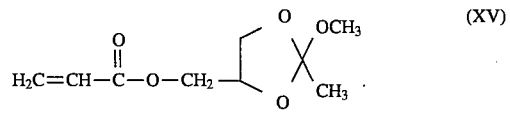

Another preferred ethylenically unsaturated ortho ester monomer is represented by the formula (XVI):

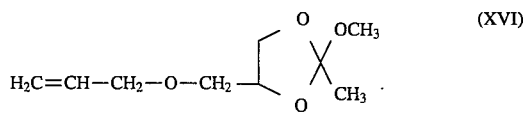

It is sometimes advantageous to use an initiator in the melt preparation of the ortho ester functional PPE with an ethylenically unsaturated ortho ester toohomer. Suitable initiators for use in the current invention include free radical initiators generally known in the art. Specific initiators include various peroxides and hydroperoxides. Specific examples include benzoyl peroxide, dicumyl peroxide, 2,5-di(t-butylperoxy)hexane, 2,5-dimethyl-2,5-di(t-butylperoxy)hexyne-3 and cumene peroxide, with 2,5,-dimethyl-2,5-di(t-butylperoxy)hexyne-3 being preferred. When it is used, the amount of initiator used can vary from about 0.05 weight percent to about 0.5 weight percent relative to the weight of the PPE.

It is also sometimes advantageous to employ at least one lubricant which is substantially inert to the ortho ester and other ingredients. The presence of the lubricant decreases the required melt processing temperature to produce the functionalized PPE, as well as the compatibilized blends prepared therefrom. As a result, gel formation is minimized.

Suitable lubricants will be apparent to those, skilled in the art; in general, they are solids with high lubricity or relatively low melting solids or oils. Examples include polytetrafluoroethylene, fatty acid amides as disclosed and claimed in copending, commonly owned application Ser. No. 07/815211 (abandoned), aluminum alkylphosphonates as disclosed and claimed in copending, commonly owned application Ser. No. 07/816629, now U.S. Pat. No. 5,376,714 and hydrogenated poly($\alpha$-olefins) as disclosed and claimed in copending, commonly owned application Ser No. 07/816430 (abandoned) and commonly owned U.S. Pat. Nos. 5,214,099 and 5,281,667, which are incorporated herein by reference.

The hydrogenated poly($\alpha$-olefins) are often preferred. They may be obtained by the catalytic polymerization of $\alpha$-olefins followed by hydrogenation to remove residual unsaturation. The catalysts which may be employed in their preparation include cationic and metathetic catalysts. Methods for preparing hydrogenated poly($\alpha$-olefins) are disclosed, for example, in U.S. Pat. Nos. 4,225,739, 4,282,392, 4,311,864, 4,319,065, 4,334,113 and 4,409,415, all of which are incorporated herein by reference. The products comprise polymers of various molecular weights, including oligomers.

The most preferred hydrogenated poly($\alpha$-olefins) are those having kinematic viscosities of about 2–20 centistokes and especially 8–12 centistokes at 100° C., as determined by ASTM procedure D445. They are commercially available from such companies as Henkel Corporation under the tradename EMERY fluids.

The hydrogenated poly($\alpha$-olefins) are generally used in a lubricating amount. The lubricating amount, based on the weight of the PPE, is generally in the range of about 1% to about 5% by weight and preferably about 2% to about 4% by weight.

A PPE to be functionalized preferably has an intrinsic viscosity of from about 0.19 dl/g to about 0.80 dl/g (measured in chloroform at 25° C.), and more preferably from about 0.25 dl/g to about 0.49 dl/g. The initial level of nitrogen in the PPE to be functionalized preferably ranges from about 120 to about 2000 parts per million. The ortho ester functionality incorporated into the PPE preferably ranges from about 0.4% to about 3% by weight on the PPE as measured by proton NMR spectroscopy.

The poly(arylene sulfide) resins (referred to hereinafter as "PPS") used in the present invention are derived from the known polymers containing arylene groups separated by sulfur atoms. The preferred poly(arylene sulfide) resins include various poly(phenylene sulfide)s, for example, poly(p-phenylene sulfide) and substituted poly(phenylene sulfide)s. Typical PPS polymers comprise at least 70 molar %, preferably at least 90 molar %, of recurring units of the following structural formula (XVII):

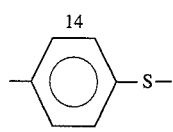

When the amount of the recurring units of formula (I) is less than 70 molar %, the heat resistance may be is insufficient.

The remaining 30 molar %, and preferably 10 molar % or less, of the recurring units of PPS can be those of the following structural formulae (XVIII):

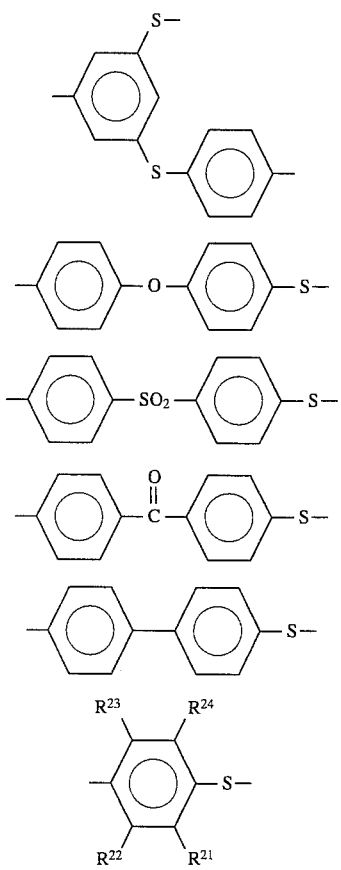

wherein $R^{21}$, $R^{22}$, $R^{23}$ and $R^{24}$ are independently selected from the group consisting of hydrogen, halogen, alkyl, phenyl, alkoxy, aryloxy, nitro, amino and carboxy groups.

The PPS of the present invention may be linear, branched or cured polymers or mixtures of the same. Linear PPS of relatively low molecular weight may be prepared by, for example, a process disclosed in the specification of U.S. Pat. No. 3,354,129, which is incoporated herein by reference. Linear PPS having a relatively high molecular weight may be prepared by, for example, the process disclosed in the specification of U.S. Pat. No. 3,919,177, which is incorporated herein by reference. Branched PPS may be prepared by the use of a branching agent for example, 1,3,5-dichloronbenzene, which is disclosed in U.S. Pat. No. 4,749,163, which is incorporated herein by reference. The degree of polymerization of the polymers prepared by the processes of U.S. Pat. Nos. 3,354,129, 3,919,177 and 4,749,163 can be further increased by curing with heating the same in an oxygen atmosphere or in the presence of a crosslinking agent such as a peroxide after polymerization.

The PPS may be functionalized or unfunctionalized. If the PPS is functionalized, the functional groups include all functional groups that are capable of reacting with the ortho ester functional groups on the PPE or with the PPE itself. Examples of appropriate functional groups may include, but are not limited to, amino, carboxylic acid, metal carboxylate, disulfide, thio, and metal thiolate groups.

One method for incorporation of functional groups into PPS can be found in U.S. Pat. No. 4,769,424, which is incorporated herein by reference, which discloses incorporation of substituted thiophenols into halogen substituted PPS. Another method involves incorporation of chlorosubstituted aromatic compounds containing the desired functionality reacted with an alkali metal sulfide and chloroaromatic compounds. A third method involves reaction of PPS with a disulfide containing the desired functional groups, typically in the melt or in a suitable high boiling solvent such as chloronaphthalene.

Though the melt viscosity of PPS used in the present invention is not particularly limited so far as the blends which can be obtained, a melt viscosity of at least about 100 Poise is preferred from the viewpoint of the toughness of PPS per se and that of about 10,000 Poise or less is preferred from the viewpoint of the injection moldability.

The PPS in this invention may also be treated to remove unwanted contaminating ions by immersing the resin in deionized water or by treatment with an acid, typically hydrochloric acid, sulfuric acid, phosphoric acid or acetic acid as found in Japanese Kokai Nos. 3,236,930-A, 1,774, 562-A, 1,299,872-A and 3,236,931-A, all of which are incorporated herein by reference. For some product applications, it is preferred to have a very low impurity level in the PPS. The impurity level is generally represented as the percent by weight ash remaining after burning a PPS sample. Typically ash contents of the PPS of less than about 1% by weight are desirable, with ash numbers less than about 0.5% by weight preferred and ash numbers less than about 0.1% by weight most preferred.

The invention also includes compositions containing elastomeric impact modifiers compatible with either or both the PPE and the PPS.

Impact modifiers for PPE and PPS are typically derived from one or more monomers selected from the group consisting of olefins, vinyl aromatic monomers, acrylic and alkylacrylic acids and their ester derivatives as well as conjugated dienes. Especially preferred impact modifiers are the rubbery high molecular weight materials including natural and synthetic polymeric materials showing elasticity at room temperature. They include both homopolymers and copolymers, including random, block, radial block, graft and core-shell copolymers as well as combinations thereof. The impact modifier may be functionalized or may not be functionalized.

Olefin polymers and copolymers employable in the invention include low density polyethylene (LDPE), high density polyethylene (HDPE), linear low density polyethylene (LLDPE), isotactic polypropylene, poly(1-butene), poly(4-methyl-1-pentene), and the like. Additional olefin copolymers include copolymers of one or more αolefins, particularly ethylene, with copolymerizable monomers including, for example, vinyl acetate, acrylic acids and alkylacrylic acids as well as the ester derivatives thereof including, for example, ethyl acrylate, methacrylic acid, methyl methacrylate and the like. Also suitable are the ionomer resins, which may be wholly or partially neutralized with metal ions.

One type of olefinic elastomer useful in the present invention are copolymers of an α-olefin with a glycidyl ester of an α,β-unsaturated carboxylic acid. α-Olefin as used herein means ethylene, propylene, butene-1, etc. Among them, ethylene is preferred. The glycidyl esters of the α,β-unsaturated acids are compounds of the general formula (XIX):

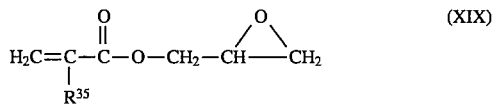

wherein $R^{35}$ represents a hydrogen atom or a lower alkyl group. Examples of the glycidyl esters of α,β-unsaturated acids include glycidyl acrylate, glycidyl methacrylate and glycidyl ethacrylate. The epoxy functional olefinic elastomer is preferably an olefinic copolymer containing from about 60% to about 99.5% by weight of an α-olefin and from about 0.5% to about 40% by weight of a glycidyl ester of an α,β-unsaturated carboxylic acid, preferably from about 3% to about 30% by weight; based on the weight of the elastomer's composition. When this amount is less than about 0.5% by weight, no intended effects can be obtained and when it exceeds about 40% by weight, gelation occurs during melt-blending resulting in degradation of the extrusion stability, moldability and mechanical properties of the produce Suitable epoxy functional α-olefin elastomers include: ethylene-glycidyl acrylate copolymers, ethylene-glycidyl methacrylate copolymers, ethylene-glycidyl methacrylate-vinyl acetate terpolymers, ethylene-glycidyl methacrylate-methyl acrylate terpolymers, ethylene-ethyl acrylate-glycidyl methacrylate terpolymers. The preferred epoxy functional elastomers are available from Sumitomo Chemical Co. under the trademarks IGETABOND and BONDFAST and from Elf Atochem under the trademark LOTADER.

A particularly useful class of impact modifers are those derived from the vinyl aromatic monomers. These include AB and ABA type block, tapered and radial block copolymers and vinyl aromatic-conjugated diene core-shell graft copolymers.

An especially preferred subclass of vinyl aromatic monomer-derived resins is the block copolymers comprising monoalkenyl arene (usually styrene) blocks and conjugated diene (e.g., butadiene or isoprene) or olefin (e.g., ethylene-propylene, ethylene-butylene) blocks and represented as AB and ABA block copolymers. The conjugated diene blocks may be partially or entirely hydrogenated, whereupon the properties are similar to the olefin block copolymers.

Suitable AB type block copolymers are disclosed in, for example, U.S. Pat. Nos. 3,078,254, 3,402,159, 3,297,793, 3,265,765 and 3,594,452 and U.K. Patent 1,264,741, all incorporated herein by reference. Examples of typical species of AB block copolymers include polystyrene-polybutadiene (SBR), polystyrene-poly(ethylenepropylene) (S-EP), polystyrene-polyisoprene and poly(ct-methylstyrene)-polybutadiene. Such AB block copolymers are available commercially from a number of sources, including Phillips Petroleum under the trademark SOLPRENE, from the Shell Chemical Co. under the trademark KRATON, and from Kuraray under the trademark SEPTON.

Additionally, ABA triblock copolymers and processes for their production as well as hydrogenation, if desired, are disclosed in U.S. Pat. Nos. 3,149,182, 3,231,635, 3,462,162, 3,287,333, 3,595,942, 3,694,523 and 3,842,029, which are all incorporated herein by reference.

Examples of triblock copolymers include polystyrene-polybutadiene-polystyrene (SBS), polystyrene-polyisoprene-polystyrene (SIS), poly(α-methyl-styrene)-polybutadiene-poly(α-methylstyrene) and poly(α-methylstyrene)-polyisoprene-poly(α-methylstyrene). Particularly preferred triblock copolymers are available commercially from Shell Chemical Co. under the trademarks CARIFLEX and KRATON.

Another class of useful impact modifiers is derived from conjugated dienes. While many copolymers containing conjugated dienes have been discussed above, additional conjugated diene modifier resins include, for example, homopolymers and copolymers of one or more conjugated dienes including, for example, polybutadiene, butadiene-styrene copolymers, isoprene-isobutylene copolymers, chlorobutadiene polymers, butadiene-acrylonitrile copolymers, polyisoprene, and the like. Ethylene-propylene-diene monomer rubbers (EPDM's) may also be used. They are typified as comprising predominantly ethylene units, a moderate amount of propylene units and up to about 20 mole percent of non-conjugated diene monomer units. They may also contain reactive groups such as acid, oxazoline, ortho-ester, epoxy, amine, or anhydride. Many EPDM's and processes for the production thereof are disclosed in U.S. Pat. Nos. 2,933,480, 3,000,866, 3,407,138, 3,093,621 and 3,379,701, which are all incorporated herein by reference.

Other suitable impact modifiers are the core-shell type graft copolymers. In general, these have a predominantly conjugated diene rubbery core or a predominantly cross-linked acrylate rubbery core and one or more shells polymerized thereon and derived from monoalkylarene and/or acrylic monomers alone or, preferably, in combination with other vinyl monomers. The shells of these impact modifiers may also contain reactive groups, for example, acid, epoxy, oxazoline, ortho-ester, amine, or anhydride groups. The core-shell copolymers are widely available commercially in pellet and powder forms, for example, from Rohm and Haas Company as grades including EXL-3330, EXL-3691, EXL-2600, EXL-2607, EXL-2647, EXL-3386, and EXL-3607, and are described in U.S. Pat. Nos. 3,808,180, 4,034,013, 4,096,202, 4,180,494 and 4,292,233.

Also useful are the core-shell copolymers wherein an interpenetrating network of the resins employed characterizes the interface between the core and shell. Especially preferred in this regard are the ASA type copolymers available from GE Plastics under the trademark GELOY, and described in U.S. Pat. No. 3,944,631, which is incorporated herein by reference.

In addition, there may be employed the above-described polymers and copolymers having copolymerized therewith or grafted thereon monomers having functional groups and/or polar or active groups. Finally, other suitable impact modifiers include Thiokol rubber, polysulfide rubber, polyurethane rubber, polyether rubber (e.g., polypropylene oxide), epichlorohydrin rubber, thermoplastic polyester elastomers and thermoplastic poly(ether-ester) and poly(ester-amide) elastomers.

The proportion of impact modifier or other resinous material is subject to wide variation. The amount of impact modifier used is generally an amount sufficient to improve the ductility of the compositions. Impact modifiers such as diblock or triblock copolymers, when utilized, are usually present in an amount up to about 50 parts per 100 parts of PPE. The epoxy functional olefinic elastomers, when utilized as an impact modifier, are usually present in an amount up to about 50 parts per 100 parts of PPS. Other impact modifiers may also be present.

The compositions of the present invention may also contain at least one polymer of an alkenylaromatic compound. Suitable polymers of this type may be prepared by methods known in the art including bulk, suspension and emulsion polymerization. They generally contain at least about 25% by weight of structural units derived from an alkenylaromatic monomer of the formula (XX)

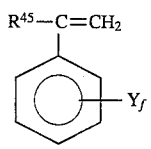

(XX)

wherein $R^{45}$ is hydrogen, lower alkyl or halogen; Y is hydrogen, vinyl, halogen or lower alkyl; and f is from 0 to 5. These resins include homopolymers of styrene, chlorostyrene and vinyltoluene, random copolymers of styrene with one or more monomers illustrated by acrylonitrile, butadiene, α-methylstyrene, ethylvinylbenzene, divinylbenzene and maleic anhydride, and rubber-modified polystyrenes comprising blends and grafts, wherein the rubber is a polybutadiene or a rubbery copolymer of about 98–65% styrene and about 2–35% diene monomer. These rubber modified polystyrenes include high impact polystyrene (commonly referred to as HIPS). Non-elastomeric block copolymer compositions of styrene and butadiene can also be used that have linear block, radial block and tapered block copolymer architectures. They are commercially available from such companies as Fina Oil under the trademark FINACLEAR resins and from Phillips Engineering Resins under the trademark K-RESINS.

The alkenylaromatic compound when present is generally used in the range from about 1% to about 25% by weight and preferably from about 5% to about 15% by weight; based on the weight of the total composition.

The addition of reinforcing fillers is also contemplated for the compositions of the present invention. Suitable reinforcing fillers are those which increase the rigidity of the blend composition. Amongst these, fibrous materials are preferred, in particular glass fibers made from low alkali E-glass, having a fiber diameter from about 8 µm to about 14 µm. The length of the glass fibers in the finished molded part is typically, for example, from about 0.01 mm to about 0.5 mm. The glass fibers may be employed as rovings or as chopped or milled glass fibers, and may be provided with a suitable finish and an adhesion promoter or promoter system based on silanes. The amount of reinforcing fillers is advantageously from about 5 weight percent to about 60 weight percent, especially from about 10 weight percent to about 40 weight percent based on the total weight of the composition.

Other fibrous reinforcing materials, e.g. carbon fibers, potassium titanate single-crystal fibers, wollastonite, gypsum fibers, aluminum oxide fibers or asbestos may also be utilized. Non-fibrous fillers, e.g. glass beads, hollow glass beads, talcs, micas, chalks, quartzes and natural or calcined kaolins are further preferred fillers, as are combinations of these materials with glass fibers. Like the glass fibers, these latter fillers may be provided with a finish and/or an adhesion promoter or adhesion promoter system. The combination of a non-fibrous filler that also has a platey structure, e.g. talcs, micas and platey kaolins, with glass fibers is especially preferred for some applications to reduce the anisotropic properties of the final composition due to alignment of the glass fiber with the direction of the mold filling during processing. The amount of non-fibrous filler can range from 0% to about 50% by weight based on the total weight of the entire composition.

The compositions of the present invention, espressed as percentages by weight of the total compositions, preferably comprise (a) the PPE at a level of from about 10% to about 90% by weight, more preferably from about 20% to about 45% by weight, and most preferably from about 30% to about 35% by weight; and (b) the PPS at a level of from about 10% to 90% by weight, more preferably from about 40% to about 70% by weight, most preferably from about 50% to about 60% by weight. The compositions may also comprise, expressed as percentages by wieght of the total composition, at least one impact modifier preferably present at a level of from about 2% to about 30% by weight, more preferably from about 5% to about 15% by weight, most preferably from about 10% to about 15% by weight.

The preparation of the compositions of the present invention is normally achieved by admixing the ingredients under conditions for the formation of an intimate blend. Such conditions often include mixing in single or twin screw type extruders or similar mixing devices which can apply a shear to the components. It is often advantageous to apply a vacuum to the melt through a vent port in the extruder to remove volatile impurities in the composition. Multiple vent ports can also be utilized.

A preferred process for preparing the ortho ester functional PPE/poly(arylene sulfide) resin compositions involves combining PPE functionalization and subsequent compounding with poly(arylene sulfide) resin and additives in a single melt compounding step. For example, PPE, graftable ortho ester, radical initiator and lubricant can be fed to a screw extruder in which the temperature and mixing regime in the first few barrel segments are suitable to facilitate efficient grafting of ortho ester functionality to the PPE. Poly(arylene sulfide) resin and additives (optionally in the form of a concentrate) may be fed to the same extruder at an appropriate down-stream feed port. The extruder may be optionally vacuum-vented at barrel segments before the poly(arylene sulfide) feed port or after the poly(arylene sulfide) feed port or at both locations. Optionally, a portion of the poly(arylene sulfide) and/or additives may be throat fed with the PPE and ortho ester monomer.

The compositions may also be made by a two step process which involves synthesizing the ortho ester functional PPE in a separate reaction step, and then melt mixing (preferably by extrusion) the ortho ester functional PPE with the poly(arylene sulfide) resin and (optionally) additives including impact modifiers.

It should also be clear that improved molded articles prepared from the compositions of the present invention represent an additional embodiment of this invention.

All patents and references cited herein are incorporated by reference.

The following examples are provided to illustrate some embodiments of the present invention. They are not intended to limit the invention in any aspect. All percentages are by weight based on the total weight of the composition, unless otherwise indicated.

EXAMPLES

PPE capped with triazine ortho ester was prepared by reaction of PPE powder (0.41 dl/g measured in chloroform at 25° C.) with 2-chloro-4(2-methoxy-2-methyl-1,3-dioxolanyl)methoxy-6-phenoxy-1,3,5-triazine in toluene solution utilizing aqueous sodium hydroxide as a base. The ortho ester functional PPE product was isolated as a powder by precipitation from the toluene using methanol. The level of incorporation of triazine ortho ester cap was determined by proton NMR spectroscopy (300 MHz in $CDCl_3$ vs. TMS) by comparative integration of ortho ester methoxy peaks at about 3.3 ppm vs. PPE aromatic peak at 6.5 ppm.

Acrylate ortho ester grafting agent was prepared by reaction of acryloyl chloride with 4-hydroxymethyl-2-methoxy-2-methyl-1,3dioxolane. To prepare the extruder grafted ortho ester functional PPE, PPE powder (0.41 dl/g measured in chloroform at 25° C.) was combined with the desired appropriate weight percent acrylate ortho ester, 3% by weight Emery 3008 lubricant, and 0.2% by weight Lupersol 130 radical initiator; where all the weights are based on the PPE weight, in a Henschel mixer. The mixtures were extruded on a Welding Engineers 20 mm, twin screw extruder with barrel set temperature of 500°–570° F. Extrudates were quenched in water, pelletized, and dried in a circulating air oven at 200°–225° F. The level of incorporation of acrylate ortho ester was determined by proton NMR spectroscopy (300 MHz in CDCl$_3$ vs. TMS) by comparative integration of ortho ester methoxy peaks at about 3.3 ppm vs. PPE aromatic peak at 6.5 ppm.

Ortho ester functional PPE/PPS blends were prepared using either PPE extrudate pellets or mechanically ground, powdered extrudate of PPE grafted with an acrylate ortho ester, or precipitated powder from the solution capping reaction of PPE with the triazine ortho ester. The blends of ortho ester functional PPE, PPS, and optional impact modifiers were mixed on a jar mill and extruded on a Welding Engineers 20 mm, twin screw extruder with barrel set temperatures of 500°–570° F. A vacuum was applied at zone 5 to give at least 30 in. (30–40 torr) gauge reading. Extrudates were quenched in water, pelletized, and dried in circulating air oven at 200°–230° F.

Test parts were prepared on an Engel 30-ton molder with a mold set temperature of 250°–270° F., barrel set temperatures of 500°–570° F., and a 48 sec. total cycle time (30 sec. cooling time). Molded test parts were equilibrated overnight at 73° F./50% humidity before testing. Notched and unnotched Izod impact values were determined as per ASTM D256. Tensile properties were determined as per ASTM D638.

The following compositions were made by a two step process involving synthesizing the ortho ester functional PPE in a first step, and then melt blending the ortho ester functional PPE and the PPS, impact modifiers and additives in a second step.

Table 1 contains several illustrative examples of ortho ester functional PPE and the percent by weight based on the weight of the PPE of incorporation for the corresponding ortho ester monomer utilized.

TABLE 1

Types of PPE-OE Used in Examples
(AOE = acrylate ortho ester (XV);
CTOE = chlorotriazine ortho ester (XI)

| OEP | OE Incorporation process | wt % AOE or CTOE incorporated |
|---|---|---|
| U-PPE | control | 0 |
| OEP1 | extruder grafting with 1.5 wt % AOE | 0.8–1.0 |
| OEP2 | extruder grafting with 2.6 wt % AOE | 1.4–1.6 |
| OEP3 | extruder grafting with 3.5 wt % AOE | 1.5 |
| OEP4 | solution capping with CTOE | 1.8 |

Table 2 shows a variety of the PPS samples that were used in the illustrative blend compositions. The differences in melt flow for the PPS grades are proportional to differences in molecular weight, and demonstrate that a very wide range of PPS molecular weights are useful in the present invention.

TABLE 2

Types of PPS Used in Examples
(melt flow determined at 300° C. under 1 kg. weight)

| PPS | general type | melt flow sec |
|---|---|---|
| PPS1 | linear | 2.3 |
| PPS2 | linear | 4.8 |
| PPS3 | branched | 18 |
| PPS4 | linear | 23 |
| PPS5 | cured | 0.8 |

Table 3 shows formulations for blends of ortho ester functional PPE (abbreviated as "PPE-OE") and PPS, with and without impact modifiers. Please refer to Table 1 for descriptions of the PPE's utilized. All blends contain 32.5 parts PPE, 55 parts PPS, and, when present, 12.5 parts impact modifier. When present, Emery 3008 polyolefin lubricant was added at 1 part level.

TABLE 3

Compositions of PPE-OE/PPS Blends
(BF = Bondfast E; KG = Kraton G-1651)

| Example | PPE | physical form | PPS | impact modifiers | additives |
|---|---|---|---|---|---|
| A | U-PPE | powder | PPS1 | 7.5 BF/5 KG | — |
| B | U-PPE | powder | PPS2 | 7.5 BF/5 KG | — |
| 1 | OEP4 | powder | PPS2 | 7.5 BF/5 KG | — |
| 2 | OEP1 | pellets | PPS1 | 5 BF/7.5 KG | — |
| 3 | OEP1 | pellets | PPS2 | 5 BF/7.5 KG | — |
| 4 | OEP1 | pellets | PPS1 | 7.5 BF/5 KG | — |
| 5 | OEP1 | pellets | PPS2 | 7.5 BF/5 KG | — |
| 6 | OEP1 | pellets | PPS4 | 7.5 BF/5 KG | — |
| 7 | OEP1 | pellets | PPS2 | 7.5 BF/5 KG | Emery 3008 |
| 8 | OEP1 | grnd ext.[a] | PPS2 | 7.5 BF/5 KG | Emery 3008 |
| 9 | OEP1 | grnd ext. | PPS5 | 7.5 BF/5 KG | — |
| 10 | OEP2 | pellets | PPS3 | 7.5 BF/5 KG | — |
| 11 | OEP2 | pellets | PPS2 | 7.5 BF/5 KG | — |
| 12 | OEP2 | grnd ext. | PPS2 | 7.5 BF/5 KG | — |
| 13 | OEP3 | pellets | PPS2 | 7.5 BF/5 KG | — |
| 14 | OEP3 | grnd ext. | PPS2 | 7.5 BF/5 KG | — |
| C | U-PPE | powder | PPS2 | — | — |
| 15 | OEP2 | grnd ext. | PPS2 | — | — |
| 16 | OEP1 | grnd ext. | PPS2 | 12.5 BF | — |
| 16 | OEP1 | grnd ext. | PPS2 | 12.5 BF | 0.2 ZnSt[b] |
| 17 | OEP1 | pellets | PPS3 | 12.5 KG | — |
| 19 | OEP2 | pellets | PPS1 | 7.5 BF/5 KG | — |

[a]grnd. ext. stands for ground extruded pellets;
[b]ZnSt stands for zinc stearate.

Table 4 shows mechanical properties determined for blends of PPE-OE and PPS optionally with impact modifiers.

TABLE 4

Properties of PPE-OE/PPS Blends

| Ex. | NI | UNI | Tens Yield | Tens. Ult. | Elong. % |
|---|---|---|---|---|---|
| A | 0.5 | 7.8 | 6646 | 6646 | 7.4 brittle |
| B | 0.6 | 12.2 | 6466 | 6466 | 7.2 brittle |
| 1 | 0.6 | NB | 6378 | 6378 | 12 |
| 2 | 0.8 | NB | 7245 | 7245 | 13 |
| 3 | 0.6 | NB | 7283 | 7283 | 14 |
| 4 | 0.7 | 13.7 | 6475 | 6575 | 11 |
| 5 | 1.3 | NB | 6806 | 6631 | 21 |
| 6 | 1.3 | NB | 7184 | 7184 | 11 |
| 7 | 0.9 | NB | 6683 | 6622 | 14 |
| 8 | 2.8 | NB | 7051 | 6751 | 35 |
| 9 | 0.7 | 8.3 | 5698 | 5698 | 8.1 UBF |

TABLE 4-continued

Properties of PPE-OE/PPS Blends

| Ex. | NI | UNI | Tens Yield | Tens. Ult. | Elong. % |
|---|---|---|---|---|---|
| 10 | 4.9 | NB | 7500 | 7367 | 27 |
| 11 | 2.0 | NB | 7044 | 6888 | 27 |
| 12 | 2.2 | NB | 7619 | 7260 | 37 |
| 13 | 0.8 | 13.7 | 6403 | 6403 | 11 |
| 14 | 3.1 | NB | 7239 | 7084 | 28 |
| C | — | — | 6625 | 6625 | 4.4 brittle |
| 15 | — | — | 10670 | 10670 | 8.0 |
| 16 | 0.4 | 11.8 | 7109 | 7109 | 8.5 UBF |
| 17 | 0.2 | 8.8 | 6977 | 6977 | 9.7 |
| 18 | 0.5 | 9.4 | 7300 | 7300 | 8.4 UBF |
| 19 | 6.9 | NB | — | 6876 | 54 |

UNI stands for unnotched Izod Impact; NI stands for notched Izod Impact; NB stands for "no break"; UBF stands for "ultimate brittle failure"; Tens. yield stands for tensile strength at yield in units of psi; Tens.ult. stands for ultimate tensile strength in units of psi; and Elong. % stands for ultimate tensile elongations. Izod impact values are in units of ft.-lb/in.; tensile strengths are given in units of psi; ultimate tensile elongations are given in percent. Unless noted, all of the blends with impact modifiers in the above table gave ductile molded test parts.

The data showed that ductile molded parts with good mechanical properties can be made from blends of ortho ester functional PPE (derived from either solution capping or melt grafting) and PPS, optionally containing at least one impact modifier. In contrast, control blends made using an unfunctional PPE (i.e. standard PPE) give brittle molded test parts. Examples A, B and C are comparative examples utilizing unfunctional PPE. Examples 1–19 are examples of the present invention utilizing ortho ester functional PPE. Examples 1–6 demonstrate that a variety of PPS types and grades can be utilized with improvements in impact strength and tensile properties. Examples 8, 12, and 14 made using mechanically ground extrudate (abbreviated as "grnd ext.") having a higher surface area gave better mechanical properties than the corresponding examples 7, 11, and 13 made using extrudate pellets. It is believed that this reflects better mixing of the ortho ester functional PPE with the PPS and impact modifiers in the relatively short residence t/me on a particular extruder employed to make these blends. For blends made without impact modifiers, the data show that the ortho ester functional PPE/PPS blend of example 15 gave significantly better mechanical properties than the corresponding control blend of comparative example C prepared using unfunctional PPE. Example 19 illustrates a composition made with more intensive mixing that the other samples are demonstrates the outstanding impact and tensile properties that can be achieved with compositions of the present invention.

What is claimed is:

1. A composition comprising:
   (a) an ortho ester functional poly(phenylene ether) resin; and
   (b) an unfunctionalized poly(arylene sulfide) resin.

2. The composition of claim 1 wherein the ortho ester functional poly(phenylene ether) resin is present at a level of from about 10% to about 90% by weight based on the total weight of the composition, and the poly(arylene sulfide) resin is present at a level of from about 10% to about 90% by weight based on the total weight of the composition.

3. The composition of claim 1, wherein the ortho ester functional poly(phenylene ether) resin is obtained by reacting a halo ortho ester compound with a poly(phenylene ether) resin.

4. The composition of claim 1, wherein the ortho ester functional poly(phenylene ether) resin is obtained by reaction of an ethylenically unsaturated ortho ester compound with a poly(phenylene ether) resin.

5. The composition of claim 4 further comprising a free radical initiator.

6. The composition of claim 1, wherein the ortho ester functional poly(phenylene ether) resin comprises ortho ester moieties of the formula:

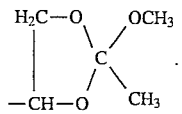

7. The composition of claim 1 wherein the ortho ester functional poly(phenylene ether) resin comprises ortho ester moieties of the formula:

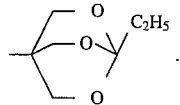

8. The composition of claim 1 wherein the poly(arylene sulfide) resin is an unfunctionalized poly(p-phenylene sulfide).

9. The composition of claim 1 further containing at least materials selected from the group consisting of fillers, reinforcing agents, inhibitors, flame retardants, drip suppressants, antioxidants, mold release agents, pigments and dyes.

10. An article made from the composition of claim 1.

11. A method for making the composition of claim 1 comprising: intimately admixing an ortho ester functional poly(phenylene ether) resin and an unfunctionalized poly(arylene sulfide) resin.

12. A composition consisting essentially of:
   (a) an ortho ester functional poly(phenylene ether) resin; and
   (b) an unfunctionalized poly(arylene sulfide) resin.

* * * * *